United States Patent [19] [11] 3,763,553

Barber et al. [45] Oct. 9, 1973

[54] METHOD OF FABRICATING INTERMETALLIC TYPE SUPERCONDUCTORS

[75] Inventors: Anthony Clifford Barber, Lichfield; Ian Leitch McDougall, Aldridge, both of England

[73] Assignee: Imperial Metal Industries (Kynock) Limited, Birmingham, England

[22] Filed: Sept. 26, 1972

[21] Appl. No.: 292,272

[52] U.S. Cl. ................ 29/599, 29/423, 174/126 CP, 174/128, 174/DIG. 6

[51] Int. Cl. .......................................... H01v 11/00

[58] Field of Search ............................ 29/599, 423; 174/126 CP, 128, DIG. 6; 335/216

[56] References Cited

UNITED STATES PATENTS

| | | | |
|---|---|---|---|
| 3,218,693 | 11/1965 | Allen et al. | 29/599 |
| 3,574,573 | 4/1971 | Tachikawa et al. | 29/599 UX |
| 3,625,662 | 12/1971 | Roberts et al. | 29/599 X |
| 3,652,967 | 3/1972 | Tanaka et al. | 335/216 |
| 3,728,165 | 4/1973 | Howlett | 29/599 |
| 3,641,665 | 2/1972 | Matricon | 29/599 |

FOREIGN PATENTS OR APPLICATIONS

| | | | |
|---|---|---|---|
| 1,021,548 | 3/1966 | Great Britain | 29/599 |
| 1,039,316 | 8/1966 | Great Britain | 29/599 |

*Primary Examiner*—Charles W. Lanham
*Assistant Examiner*—D. C. Reiley, III
*Attorney*—Cushman et al.

[57] ABSTRACT

A method of manufacturing a superconductor which contains a superconductive intermetallic compound of at least two elements, includes the steps of producing a composite precursor having at least one filament which contain at least one of said elements and is embedded in and supported by a ductile metal matrix material, passing the precursor into a molten bath containing the remainder of said elements which removes substantially all of the matrix material from said filament(s) and which replaces the removed matrix material with a substance comprising the remainder of said elements, and reacting together said elements to produce said compound.

16 Claims, 1 Drawing Figure

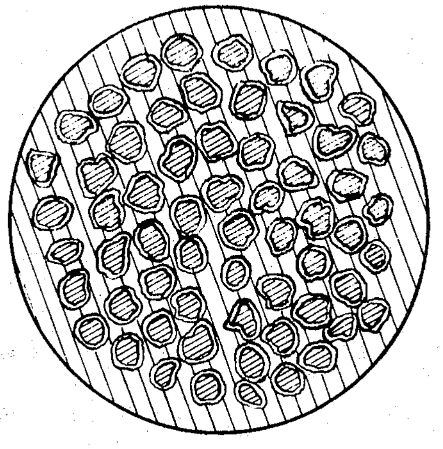

METHOD OF FABRICATING INTERMETALLIC TYPE SUPERCONDUCTORS

BACKGROUND OF THE INVENTION

This invention relates to superconductors and methods of manufacture thereof. The invention is specifically concerned with superconductors which comprise a superconductive intermetallic compound of at least two elements, examples being $Nb_3Sn$ and $Nb_3Al$.

For many years the superconductive intermetallic compound $Nb_3Sn$ has been recognised to have a very high latent commercial utility in view of its excellent superconductive properties. These properties are its high critical temperature and large current-carrying capacity in particular in magnetic fields of 100 Kilogauss and above.

However, $Nb_3Sn$ and nearly all other intermetallic compounds suffer from the disadvantage that they are brittle so that, once the compound has been produced, it can only be handled with care and no major deformation of it will be tolerated without substantial damage. Thus for $Nb_3Sn$ the elastic limit is reached with an extension of about 0.002 percent.

Consequently there have been three basic methods of manufacturing a superconductor comprising the intermetallic compound $Nb_3Sn$. In the first, niobium and tin are worked together to the required extended form of superconductor; in the second, tin is supplied to an elongated niobium conductor; and in the third, niobium and tin are deposited on a suitable elongated substrate. In all methods there is finally, or during deposition, a chemical interaction between the niobium and the tin to produce the superconductive compound.

These methods suffer from serious disadvantages; with regard to the first method, the working properties, in particular the yield strength and resistance to deformation, of niobium and tin are so very different, and many of the working processes have to be carried out at such a temperature and pressure that the tin is molten, that great difficulty is encountered in confining the tin and maintaining it in contact with the niobium. Another difficulty with the first method is that of providing sufficient niobium to tin interface to give rise, after reaction, to a sufficiently large volume of superconductor within the composite. With the second and third methods, the extended niobium conductor containing the $Nb_3Sn$ layer is extremely fragile and care is needed to situate that layer on or near to the neutral axis of the conductor. Also it is difficult to provide the conductor in a sub-divided form necessary for stable and predictable performance and, moveover, it is difficult to provide the twisted arrangement of filaments which has been shown in composite conductors to be necessary for application under AC conditions or where a rapid sweep or variation of current or field is likely.

Whilst the above methods and disadvantages have been described specifically in relation to the manufacture of $Nb_3Sn$, they are generally encountered in the manufacture of most superconductive intermetallic compounds, so that whilst the present invention is particularly concerned with the manufacture of $Nb_3Sn$, it has a considerably wider scope amongst other superconductive intermetallic compounds.

It is an object of the present invention to provide an improved method of manufacturing superconductors which comprise superconductive intermetallic compounds.

SUMMARY OF THE INVENTION

In accordance with the present invention, a method of manufacturing a superconductor comprising a superconductive intermetallic compound of at least two elements, includes the steps of producing a composite precursor comprising at least one filament which comprises at least one of said elements and is embedded in and supported by a matrix material, passing the precursor into a liquid material or vapour containing the remainder of said elements to remove at least part of the matrix material from said filament or filaments and replace the removed matrix material by a substance comprising the remainder of said elements, and reacting together said elements to produce said compound.

The reacting together of the elements to produce said compound may be carried out either in the liquid material or in a vapour of said material or after emergence from the liquid or vapour material of said filament in said substance.

Preferably the precursor is passed into a molten material containing the remainder of said elements so as to remove the matrix material from said filament by dissolution, in which case the melting point of said filament must be higher than the temperature of the molten material.

With use of the present invention, the normally fragile filament or filaments of one element of the compound eg niobium, are supported by and protected within a matrix material until immersion in the liquid or vapour material, whereupon the matrix material is removed and immediately replaced by a substance from the liquid material which will then continue to give protection and support to the filament or filaments and will also supply the other element or elements needed to produce the intermetallic compound. The conditions of the liquid material can be such that there is simultaneously produced the intermetallic compound although greater efficiency may result if the reacting together of those elements is carried out subsequently.

Preferably the composite precursor includes at least one reinforcing filament which will not be removed by the liquid material and will exist in the manufactured superconductor. This will supplement the strength of the manufactured superconductor and will aid in counteracting any brittleness encountered with the superconductive compound. The reinforcement material may consist of at least one filament of a material which is unreactive with the liquid material, for example stainless steel if this is appropriate, or it may be protected from attack by the liquid material by being embodied within said filament comprising a first one of the elements. Alternatively at least one reinforcing filament may be provided as a corresponding strand in a cable including the composite precursor.

DESCRIPTION OF THE PREFERRED EMBODIMENTS

A typical embodiment of the invention and various possible alternatives to it will now be described.

This embodiment is described in relation to the superconductive compound $Nb_3Sn$ so that there is first produced a composite precursor which comprises a matrix material containing a plurality of filaments each consisting of niobium. The composite precursor needs to be of approximately the correct final dimensions of the requisite superconductor so that there is chosen as the matrix material a ductile metal which can be co-processed with niobium, ie a metal which has a similar yield strength and similar cold working properties. A suitable metal has been found to be copper or copper alloys although other materials which process with niobium might be suitable, like nickel or aluminum. Accordingly, an extrusion can of copper is provided with a niobium bar to form an assembly, the assembly is closed, preferably after evacuation, and is then extruded at between room temperature and 900°C to form a copper-clad niobium bar. This bar is drawn through a sequence of reducing dies to produce a copper-clad rod.

The copper-clad rod is then cut into eg 61 lengths, which are assembled together within a further copper extrusion can which is subsequently evacuated and sealed, the assembly so formed being extruded at room temperature to 900°C and drawn through a further series of dies to reduce the diameter of each filament of niobium to about 10$\mu$m.

The above sequence of co-working, cutting, assembling, and further working can be repeated many times if necessary, and the degree of working varied in order to produce the requisite composite precursor in which in a copper matrix there are provided the required number of niobium filaments each having the requisite diameter. A typical composite precursor consists of a wire of 250$\mu$m diameter of copper containing 61 niobium filaments 10$\mu$m in diameter.

The composite precursor, or a transposed cable made up from several strands of the composite precursor, is then passed into a bath of molten tin which is preferably maintained at about 500°C, although other temperatures at which tin is molten will suffice, with each portion of the precursor being exposed to that preferred temperature bath for about 5 minutes. At this temperature the tin will rapidly dissolve away the copper matrix material although it will have little effect upon the niobium filaments within the matrix, so that the niobium filaments are temporarily supported by the molten tin. The filaments are then drawn together out of the surface of the tin bath with a layer of molten tin around each filament, the surface tension between the tin layers drawing the niobium filaments together into a geometrical array nearly identical to that in which they were arranged in the precursor. It is advantageous to twist the composite precursor before passing through the molten tin bath; this helps to maintain the filamentary array within the composite and provides a twisted arrangement of filaments which has been recognised as being advantageous for certain applications.

The tin coated niobium filaments are then submitted to a temperature of about 870° to 950°C in a further liquid tin bath for about 5 minutes in order to produce interdiffusion between the tin and the niobium and produce the intermetallic compound $Nb_3Sn$. The degree of conversion of the niobium of the filaments to the intermetallic compound depends upon the length of time during which the temperature of 870° to 950°C is effective. Both of the liquid tin baths are maintained either under vacuum or an appropriate inert atmosphere. Alternatively the tin coated niobium filaments may be submitted to a temperature of about 870° to 950°C in a vacuum or an inert atmosphere for about 5 minutes in order to produce interdiffusion between the included tin and the niobium filaments.

If required, a single tin bath can be used maintained at the temperature of 950°C so as to commence production of $Nb_3Sn$ as soon as sufficient copper has been dissolved from the precursor to expose the outermost niobium filaments. However, this will result in those outermost niobium filaments being submitted to molten tin for a longer period of time than the innermost ones so that the compound $Nb_3Sn$ will be formed to a greater degree on those outermost filaments. There will then be some inhomegeneity between the original niobium filaments which may not be desirable.

As a further alternative, two molten tin baths can be used, of which the first is maintained at approximately 800°C; this will dissolve away the copper very rapidly and will slowly form the compound $Nb_6Sn_5$ around the niobium filaments. At this temperature there is little formation of stable $Nb_3Sn$. In the second bath, which is maintained at about 950°C, the compound $Nb_6Sn_5$ is slowly converted to the superconductive compound $Nb_3Sn$, but this is effected at a slower rate than that at which pure niobium will react with tin to form $Nb_3Sn$. There can therefore be obtained better control of the production of $Nb_3Sn$. In addition, there will remain between the $Nb_3Sn$ and the tin a thin layer of $Nb_6Sn_5$ which is not superconductive at the usual operating temperature of 4.2°K or above and which is therefore relatively insulating when the $Nb_3Sn$ is superconductive. This can have benefits as will be described below.

When the heat treatments of the superconductor to produce the $Nb_3Sn$ have been completed, the resulting superconductor is cooled to solidify the thin layer of tin which still remains between the layers of $Nb_3Sn$ with or without central cores of niobium, so that the $Nb_3Sn$ is then held in a supporting matrix of tin.

Considering the manufactured superconductor, the matrix of tin will serve to hold the superconductor filaments together and provide them with protection, and will also act as a heat sink should heat be produced by, for example, flux jumps during use of the superconductor at cryogenic temperatures. Tin may also be effective in shunting current past any normal region of a particular superconductor filament because it will have a greater electrical conductivity than that of the compound $Nb_3Sn$ when the latter is not superconductive.

For electrical protection and to increase stability of the composite the presence of some good normal conductor is desirable. This might be achieved in several ways.

*a.* The niobium filaments in the precursor could be replaced by one or more niobium tubes, in which there is contained copper or aluminum, or silver or an alloy thereof.

*b.* The reacted composite could be passed through a bath of molten copper, aluminum or silver to produce a layer of good normal conductor on the composite.

*c.* A layer of copper, aluminum or silver could be plated or deposited in some other way onto the reacted composite.

In addition the tin baths described above can be replaced by baths of molten bronze or other alloys containing tin which will still remove the copper matrix of the composite precursor, but replace it by the corresponding alloy. If appropriate the bronze or other alloy can be maintained at a temperature between the liquidus and solidus of the equilibrium phase composition so that the liquid phase has a higher tin content available for reaction and the solid phase helps to maintain the filamentary array in position in the bath. This alloy will readily supply tin for interdiffusion with niobium to produce $Nb_3Sn$, but will be stronger than a pure tin matrix.

The superconducting part of the superconductor is constituted by the compound $Nb_3Sn$ which will either be in the form of a surface skin around each of the original niobium filaments or, if the reaction to produce the $Nb_3Sn$ has been continued for a sufficiently long period, will be in the form of homogeneous filaments of $Nb_3Sn$ with complete absorption of the niobium in the production of the intermetallic compound. Whichever form is taken up by the $Nb_3Sn$, the boundary between it and the tin matrix will be constituted by the non-superconductive intermetallic compound $Nb_6Sn_5$ mentioned above. This compound will therefore act to reduce the electrical connection between one filament and the next and will therefore aid the reduction of eddy currents within the superconductor. Of particular relevance to the latter point of eddy current reduction, the superconductive filaments can be twisted about the axis of the superconductor, for example as described in British Patent No. 1205130, the location of each filament of $Nb_3Sn$ being defined by the corresponding location of the niobium filament in the composite precursor. The twisting of the filament also aids control of the niobium filaments within the molten tin baths by preventing excessive drift between different filaments. A surprising feature of the present invention is, in fact, the way in which drifting of the filaments whilst temporarily unsupported within the molten tin baths is compensated for by the surface tension forces as the superconductor is removed from the bath. These forces draw the filaments towards each other and they resume a configuration which is remarkably close to that of their original array. Hence there is a low matrix to superconductor volume ratio. This is illustrated in the accompanying cross-section drawing which shows 61 filaments of niobium which are located in a tin matrix, the border of each niobium filament having been converted into $Nb_3Sn$ by the appropriate heat treatment. Just visible immediately adjacent the edges of the tin matrix is a very thin layer of the compound $Nb_6Sn_5$. It will be readily seen that the niobium filaments are located in a very uniform geometrical array, despite the fact that after manufacture of the precursor with the niobium filaments in that same array, the filaments have been passed through the tin bath with the replacement of the original copper matrix by the tin.

As an alternative to using copper as an initial support for the niobium, silver or nickel could be used. Although silver is more expensive than copper, it has the advantage of not dissolving in the niobium to such a large extent as copper. This solution of the carrier in the niobium results in a reduction in the ultimate performance of the superconductor and is, therefore, to be minimised as much as possible. Copper has a 3.7 percent solubility in niobium at 20°C whereas silver has substantially zero solubility up to 1700°C.

The tensile strength of pure silver is about half that of pure copper, but this may be raised to equal that of copper by the addition of 5wt.% copper. The melting point of this alloy is 890°C. Compatibility with niobium with respect to deformation and flow can, therefore, be achieved using silver alloys. If this amount of copper proves deleterious in that copper still enters into solution in the $Nb_3Sn$, it is envisaged that the tensile strength of silver may be increased to that of copper by the addition of species which have a chemical affinity with $Nb_3Sn$ but no perturbing effects, such as Pb and In or Al. Additions of either 2.5at.% PbO, 10at.% Al or 10at.% In to silver make it mechanically compatible with Nb.

| Tensile strength | Alloy at.% |
|---|---|
| 20,000 p.s.i. | 99.99 Ag |
| 40,000 p.s.i. | 95 Ag + 5 Cu |
| 38,000 p.s.i. | 99.99 Cu |
| 37,000 p.s.i. | Ag + 2.5 PbO |
| 39,000 p.s.i. | Ag + 10 In |
| 41,000 p.s.i. | Ag + 10 Al |

The main description above has been directed to the manufacture of a superconductor comprising $Nb_3Sn$. Whilst the main benefits of the invention are particularly applivable to $Nb_3Sn$, because of the softness of tin, the difficulty of confining it during co-working process and heat treatments, the invention is applicable to other superconductive intermetallic compound manufactures. An example is the manufacture of $Nb_3Al$ in which the niobium filaments are manufactured in the way described above in a precursor with a copper matrix, the precursor then being passed through a molten bath of aluminum Other examples are the manufacture of:

Nb-Al-Ge using niobium filaments and a bath of Al and Ge $V_3Si$ using vanadium filaments and a bath of silicon or silicon alloy eg Cu-Si.

A particular advantage of the technique is that the bath composition can be varied to produce different compositions of the A15 crystal type as defined on page 333 of the "International Tables for X-Ray Crystallography" Volume 1 (1952).

We claim:

1. A method of manufacturing a superconductor containing a superconductive intermetallic compound formed from at least two elements said method comprising including the steps of producing a composite precursor which includes at least one filament of said elements, said filament being embedded in and supported by a ductile matrix material selected from the class consisting of copper, silver, nickel, aluminum, and an alloy based on these metals, metalworking the precursor to the desired shape, passing the precursor into a molten bath which contains the remainder of said elements in order to remove substantially all of the matrix material from said filament, replacing the removed matrix material with a metal substance which contains the remainder of said elements, and reacting together said elements to produce said compound.

2. A method as claimed in claim 1 in which the step of reacting together the elements to produce the compound is carried out in the molten bath or in a vapor consisting of said bath material.

3. A method as claimed in claim 1 in which the step of reacting together the elements to produce the compound is carried out after emergence of said filament from the molten bath.

4. A method as claimed in claim 1 wherein the molten bath into which the precursor is passed contains the remainder of said elements and removes the matrix material from said filament or filaments by dissolution, the temperature of the molten bath being below the melting point of said filament.

5. A method as claimedd in claim 1 wherein the precursor includes at least one reinforcing filament which is not soluble in or react with the molten bath and which forms part of the manufactured superconductor.

6. A method as claimed in claim 5 in which the reinforcing material consists of at least one filament which is covered with a material unreactive with the molten bath.

7. A method as claimed in claim 1 wherein said filament is formed of niobium and the remainder of the elements are chosen from the group consisting of tin, aluminum, and germanium.

8. A method as claimed in claim 1 wherein said filament is formed of vanadium and the remainder of the elements consists of silicon or a silicon alloy, in particular a copper-silicon alloy.

9, A method as claimed in Claim 1 wherein said intermetallic compound is chosen from the class consisting of $Nb_3Al$, $Nb_3Ga$, and $V_3Ga$.

10. A method as claimed in claim 1 wherein said filament is twisted about the axis of the superconductor.

11. A method as claimed in claim 7 wherein niobium filaments in a matrix of copper, or silver, or an alloy thereof are passed into a bath of molten tin at a temperature of about 500°C, said filaments remain in the bath for about 5 minutes, the filaments are removed from the bath and heat treated in another liquid tin bath for about 5 minutes in a temperature range of about 870°C–950°C.

12. A method as claimed in claim 7 wherein niobium filaments in a matrix of copper, or silver, or an alloy thereof are passed into a bath of molten tin at a temperature of 950°C for a period in excess of 5 minutes.

13. A method as claimed in claim 7 wherein niobium filaments in a copper matrix are passed first through a bath of molten tin at a temperature of 800°C, and then into a second bath at about 950°C.

14. A method as claimed in claim 1 wherein said filament is in the form of a tube containing copper, aluminum, silver or an alloy thereof.

15. A method as claimed in claim 1 wherein the manufactured intermetallic superconductor is passed through a bath of molten copper, aluminum or silver or an alloy thereof to produce a layer of good normal conductor on the superconductor.

16. A method as claimed in claim 1 wherein said filament has a diameter of approximately 10 microns.

* * * * *

UNITED STATES PATENT OFFICE
CERTIFICATE OF CORRECTION

Patent No. 3,763,553 Dated October 9, 1973

Inventor(s) Anthony Clifford Barber et al

It is certified that error appears in the above-identified patent and that said Letters Patent are hereby corrected as shown below:

(1) In the heading, Foreign Application Priority Data should be added as follows:

-- October 4, 1971 Great Britain 46053/71 --

Signed and sealed this 9th day of April 1974.

(SEAL)
Attest:

EDWARD M.FLETCHER,JR.
Attesting Officer

C. MARSHALL DANN
Commissioner of Patents